Aug. 23, 1960 P. C. GOLDMARK 2,950,116

PHONOGRAPH RECORD

Original Filed March 14, 1952 3 Sheets-Sheet 1

INVENTOR
Peter C. Goldmark
BY
Pennie, Edmonds, Morton, Barrows and Taylor
ATTORNEYS Aug. 23, 1960 P. C. GOLDMARK 2,950,116

PHONOGRAPH RECORD

Original Filed March 14, 1952 3 Sheets-Sheet 2

INVENTOR
Peter C. Goldmark
BY
Pennie, Edmonds, Morton, Barrows and Taylor
ATTORNEYS PHONOGRAPH RECORD
Original Filed March 14, 1952
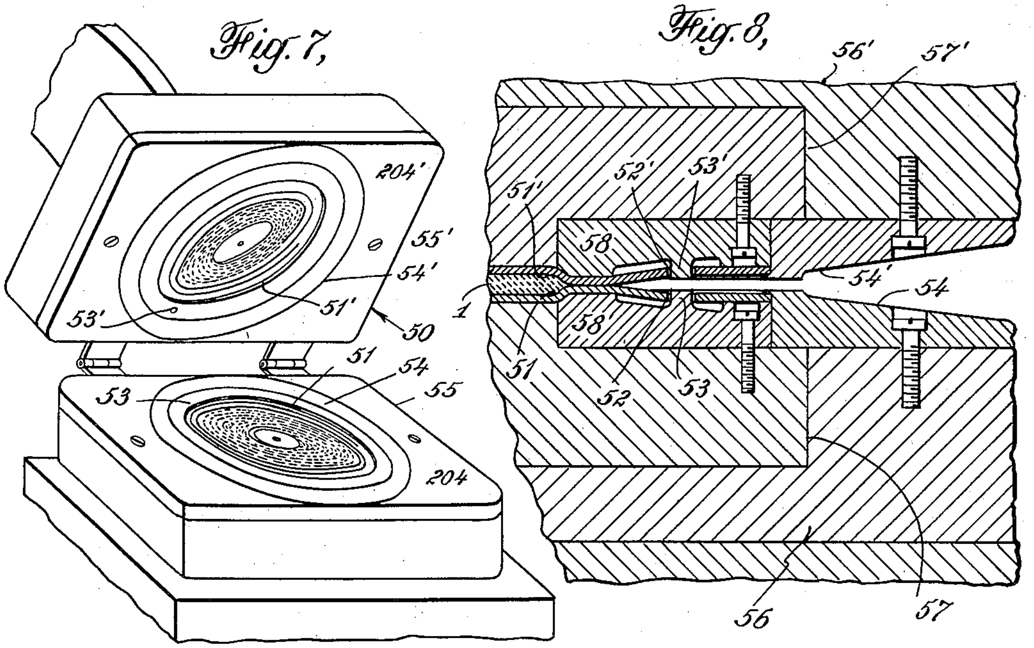
Fig. 7, Fig. 8,
Fig. 9.
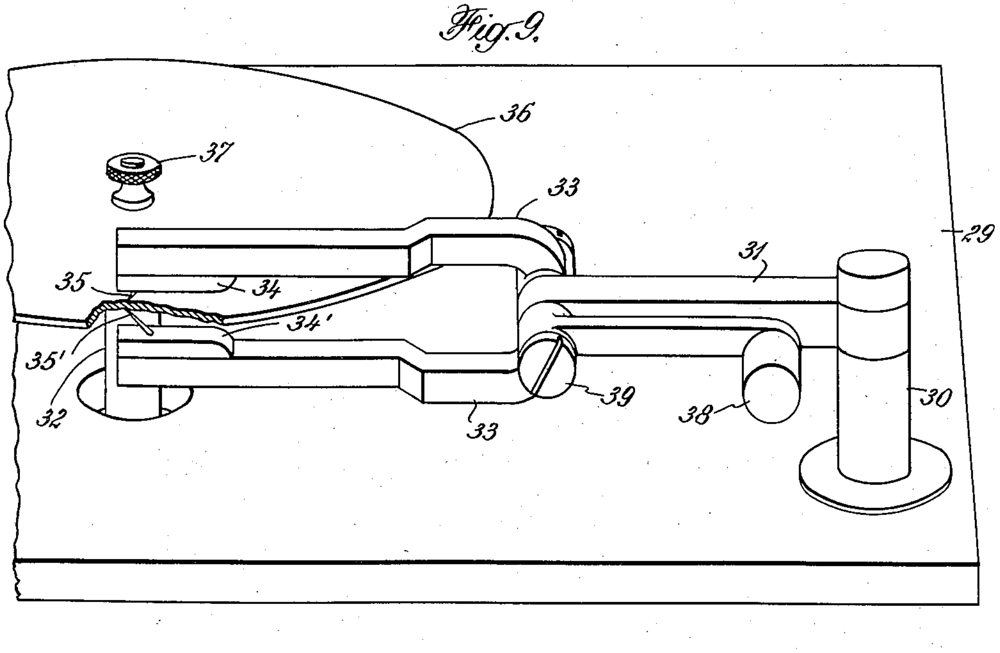
INVENTOR
Peter C. Goldmark
BY
Pennie, Edmonds, Morton, Barrows and Taylor
ATTORNEYS United States Patent Office 2,950,116
Patented Aug. 23, 1960

2,950,116

PHONOGRAPH RECORD

Peter C. Goldmark, New York, N.Y., assignor to Columbia Broadcasting System, Inc., New York, N.Y., a corporation of New York Original application Mar. 14, 1952, Ser. No. 276,648. Divided and this application Dec. 24, 1956, Ser. No. 630,376

2 Claims. (Cl. 274—46)

This invention relates to phonograph records and to the manufacture thereof, and more particularly to a flat disk phonograph record bearing stereophonically related recordings of the same sounds, and to a method for the manufacture thereof.

The invention provides a disk phonograph record on which two spiral sound grooves are formed in known, permanently fixed relative positions on the opposite faces of the record to reproduce on their simultaneous playback the differences in amplitude and phase of sound vibrations from one or more common sources existing at separate points of pickup upon recording. The sound grooves are disposed on opposite sides of the record and carry at every angular distance along their lengths from predetermined bearings about the axis of the record undulations representative of sounds perceived at the same instants of time at spatially separate locations with respect to a sound source, usually of spatially extended and harmonically composite nature.

With the record of the invention therefore by the use of separate playback transducers, amplifiers and loudspeakers or earphones, sound programs such as orchestral works, for example, may be reproduced with stereophonic realism, giving to the hearer the illusion of the spatial extension or orientation of the original sound source or sources with respect to the spaced pickup points.

The record of the invention may give to the hearer via separate loud-speakers the illusion of perceiving, at his spatial location with respect to those speakers, the extension or orientation of the sound source which he would have enjoyed had he been located at the same position with reference to the pickup microphones in the presence of the sound source as the position in which he is in fact located with reference to the speakers. The illusion is the result of his binaural faculty in hearing with both ears the sounds reproduced by the two speakers and of the stereophonic relation of the sounds reproduced by those speakers. In such case the spacing of the pickup microphones may be relatively large.

Or the record may be used to give binaural hearing directly with separate reproducing channels extending from each sound groove on the record to one ear of the hearer to the substantial exclusion of the other ear, as by earphones, or by loud-speakers disposed at equal distances on opposite sides of a listener facing perpendicularly to the line joining the speakers. In this latter case the hearer will have the illusion of being located with respect to the original sound source as were located the two pickup microphones when the recordings impressed on the two faces of the record were made. In such case the spacing of the pickup microphones may be relatively small.

The sound grooves of the two faces of the record will hereinafter be referred to as stereophonically related, whether they represent sound wave vibration trains perceived at points spaced by distances of the order of the separation of the human ears or by larger distances, and the reproduction of the sounds so recorded will in either case be referred to as stereophonic.

It has been proposed heretofore to produce a phonograph record bearing two stereophonically related sound grooves in which the two grooves are provided on the same side of the record in interlaced relation. At the very best, such a record can have a continuous playing time no more than half that available from one face of the usual single sound groove record, assuming that the radial distance between the adjacent interlaced spiral grooves can be made the same as the radial distance between successive turns of the single spiral groove of the customary non-stereophonic record. In fact, the problem of spacing the two recording heads as necessary to inscribe interlaced grooves in a single master record will require somewhat larger radial distances between the interlaced spirals, with further shortening of the playing time of such a record.

By contrast, the single spiral grooves of the record of the invention may be cut with the very fine pitches of 300 or more grooves per inch, which characterize the recently developed long-playing records, to produce a stereophonic phonograph record having an uninterrupted playing time of the order of a half hour for a twelve inch diameter.

The invention will now be described in terms of a preferred embodiment by reference to the accompanying drawings in which:

Figs. 1*a* and 1*b* are plan views of the two opposite faces of a single flat disk phonograph record according to the invention, the two views being taken without relative rotation of the observer and disk about the disk axis, so that for example points on the face of Fig. 1*a* seen at 3 o'clock in that figure are, in the physical structure of the record, directly opposite points on the face of Fig. 1*b* seen at 9 o'clock in that figure.

Fig. 7 is a partial perspective view of a phonograph record press including negative stamper dies formed from the master record disks of Figs. 4 and 5, positioned to press a phonograph record according to the invention.

Fig. 8 is a partial sectional view through the two halves of a press such as that of Fig. 7, in closed position, showing the relative circumferential position of the matrices for manufacture of a record according to the preferred embodiment of the invention as shown in Figs. 1*a* and 1*b*.

Fig. 9 is a perspective view, partly broken away, of a phonograph record of the invention according to the embodiment of Figs. 1*a* and 1*b* shown in conjunction with playback apparatus suitable for reproducing the sounds recorded thereon.

Figure 1B:
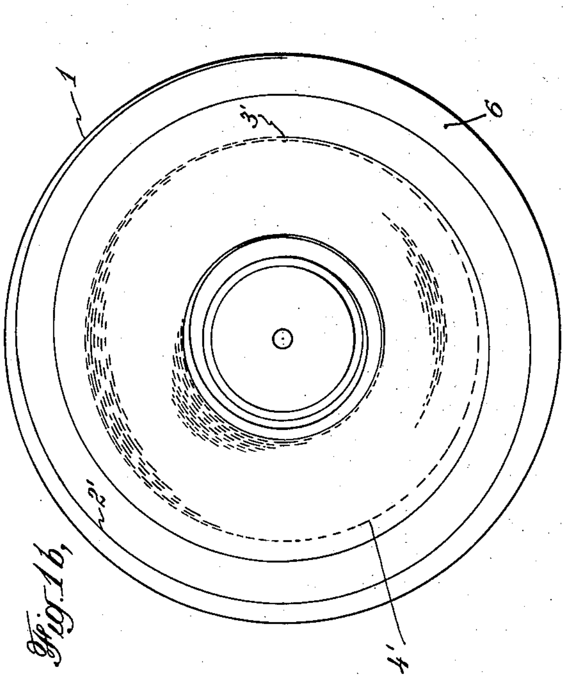
Figure 1A:
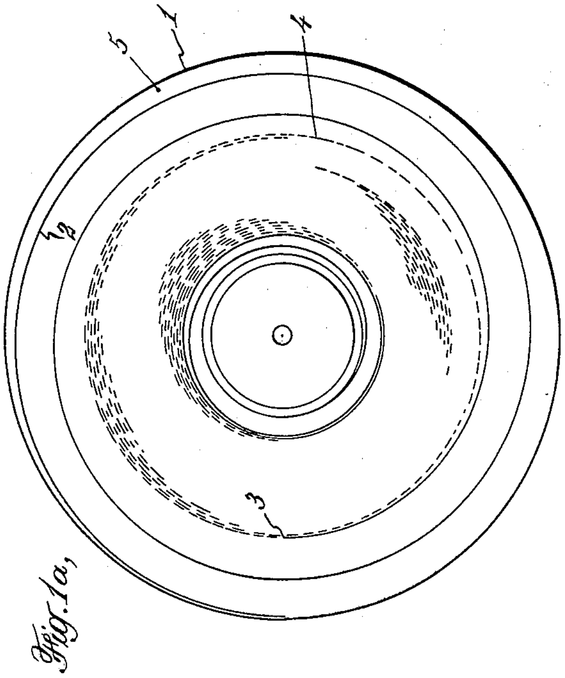

Referring to Figs. 1*a* and 1*b*, the phonograph record of the invention comprises a flat disk 1 of a suitable material such as a vinyl compound or polystyrene, having opposite parallel circular faces 5 and 6 respectively shown in Figs. 1*a* and 1*b*. On the faces 5 and 6 there are provided near the outer circumference of the disk oppositely directed spiral lead-in grooves 2 and 2′ having relatively large pitch. The lead-in grooves 2 and 2′ connect at their inner ends 3 and 3′ with oppositely directed spiral sound grooves 4 and 4′ having a large number of turns of relatively small pitch. Impressed in the spiral sound grooves 4 and 4′ are sequences of undulations representative of sequences of sound vibrations, the undulations on the two faces of the disk being respectively representative of sound vibrations simultaneously perceived at separate locations with respect to one or more sources of sound.

The spiral grooves 4 and 4′ are said to be oppositely directed because, when they are viewed from their respective faces, one groove spirals inwardly (or outwardly) in the clockwise direction while the other groove spirals inwardly (or outwardly) in the counterclockwise direction. Whether a groove spirals inwardly (or outwardly) clockwise or counterclockwise is to be determined of course in terms of the record on which the groove is formed and not in terms of the sense of rotation which will be given to the record on playback. Thus, a groove spirals inwardly clockwise if, in moving along the groove clockwise about the center of the record, one approaches the center of the record.

In phonograph records the spiral sound grooves, and the lead-in grooves as well, of course have a sense as well as a geometrical shape. That is, they are cut either from the outside of the record towards the center or vice versa, and they must be played back in the same sense. The direction of the spiral grooves as above defined is independent of their sense. Thus, a sound groove which, in the geometrical meaning of the term, spirals inwardly when traversed clockwise relative to the record, may be cut either from the center to the periphery or vice versa, so that temporally successive portions of the groove to be engaged by the playback stylus are disposed either successively closer to the center of the record or successively closer to its edge. This sense of the spiral as distinguished from its direction, determines the sense of rotation which must be imparted to the record, but it does not affect the direction of the spiral as above defined.

In the preferred embodiment of the invention illustrated in Figs. 1*a* and 1*b*, the lead-in and sound grooves are respectively oppositely directed, and they have the same sense. Thus both sides of the record will be played back either from the edge to the center or from the center to the edge.

The undulations in each of the spiral sound grooves 4 and 4′ are, at every angular distance from starting points in each of these grooves at predetermined bearings about the axis of the disk defined for the two faces of the record, representative of sounds simultaneously perceived at spaced locations with reference to the source or sources whose sounds are recorded. Otherwise stated, the undulations at every angular distance along the sound groove 4, from a starting point in that groove at a known bearing about the axis of the record and in a known turn of that groove, are representative of sounds perceived at one of the pickup points during recording at the same time as were perceived at the other pickup point the sound represented by the undulations in the groove 4′ at the same angular distance from a starting point in groove 4′, the starting point in groove 4′ being located at a known bearing about the axis of the record and in a known turn of the groove 4′.

These starting points may be the first points in the sound grooves at which there exist stereophonically related undulations, or any pair of points which are at equal angular distances from such stereophonically related points. In the embodiment of Figs. 1*a* and 1*b*, the points 3 and 3′ at which the lead-in grooves 2 and 2′ join with the sound grooves 4 and 4′ are sound groove starting points.

The angular distance from such a groove starting point as 3 or 3′, of predetermined bearing about the axis, to any chosen subsequent point in the groove containing that groove starting point is equal to the total angle through which the record must be rotated in order to guide a stylus from that groove starting point to the subsequent groove point in question.

The stereophonic relation of the undulations at points in the two sound grooves which are at equal angular distances from their groove starting points resides in the correspondence between such undulations and sound vibrations substantially simultaneously perceived at separate locations of pickup on recording. This means that, at least as to frequencies of the lower audible range, the undulations at the two points in question on the record faces will reproduce the differences in phase existing at the pickup locations, and as to higher frequencies, they will reproduce the differences in amplitude existing at the pickup locations.

The maximum frequency at which the differences in phase present at the locations of pickup will exist at points in the two sound grooves of the record equidistant from their groove starting points depends, among other things, upon the accuracy with which equality of angular speed is maintained for the turntables on which are cut the two master records from which the sound grooves 4 and 4′ of the two faces of the record of the invention are derived. This equality of angular speed should be maintained closely enough so that as to the maximum frequency for which it is desired to rely upon the phase-sensitive feature of binaural hearing, the phase difference along the two grooves for inphase excitations of the pick-up microphones will not exceed one-half cycle.

In the preferred embodiment of the invention illustrated in Figs. 1*a* and 1*b*, the two sound grooves are so formed that their starting points 3 and 3′ are at the same radial positions with respect to the axis of the record, and the grooves 4 and 4′ thereafter respectively possess the same pitch. The lead-in grooves 2 and 2′ likewise start at the same locations radially of the axis, and while the pitch of the lead-in grooves may change along their length, it is the same for both at equal angular displacements from their starting points. Therefore, in the embodiment shown in the drawings, stereophonically related undulations in the two sound grooves are located not only at equal angular distances along their associated spiral grooves from the initial stereophonically related undulations therein, but are also located at equal linear distances along their associated spirals therefrom and at equal radial distances from the axis.

Accordingly in the embodiment of Figs. 1*a* and 1*b* the lead-in grooves 2 and 2′ and the sound grooves 4 and 4′ are, apart the transverse sound undulations therein, respectively substantially congruent, within the accuracy of the equipment with which are cut the master records from which these grooves are derived, and they are coaxial. Since the grooves are not coplanar, their congruence is that of space figures. With such congruent sound spirals, any pair of points on those spirals at equal distances from the centers of the spirals, i.e. from their common axis, may be considered as groove starting points.

Moreover, in the embodiment of Figs. 1*a* and 1*b* the starting points 3 and 3′ of the sound grooves, and the starting points of the lead-in grooves as well, are located at the same angular positions about the record axis. Since the sound groove starting points 3 and 3′ are located at the same positions radially and angularly of the record axis, they lie at the intersections with the two faces of the record of a line parallel to its axis, i.e. perpendicular to the record faces, and all subsequent stereophonically related undulations in the two grooves 4 and 4′ lie at the intersections with the two faces of the record of lines parallel to its axis. The two congruent, coaxial sound spirals so equiangularly disposed about their common axis may be thought of as constituting ideally the traces of the planes of the record faces in a cylindrical surface having as directrix one of these spirals.

The essential attribute of the record of the invention whereby the undulations in the sound grooves of its two faces at every angular distance from known bearings circumferential of the record are representative of sound simultaneously perceived at the two points of pickup is imparted to it by cutting at exactly the same angular speed the two master records from which the two sound grooves are derived. Manufacture of the record of the invention in accordance with this criterion and in accordance with the other properties of the embodiment of Figs. 1*a* and 1*b* will now be described in terms of Figs. 2–9.

Figure 2:
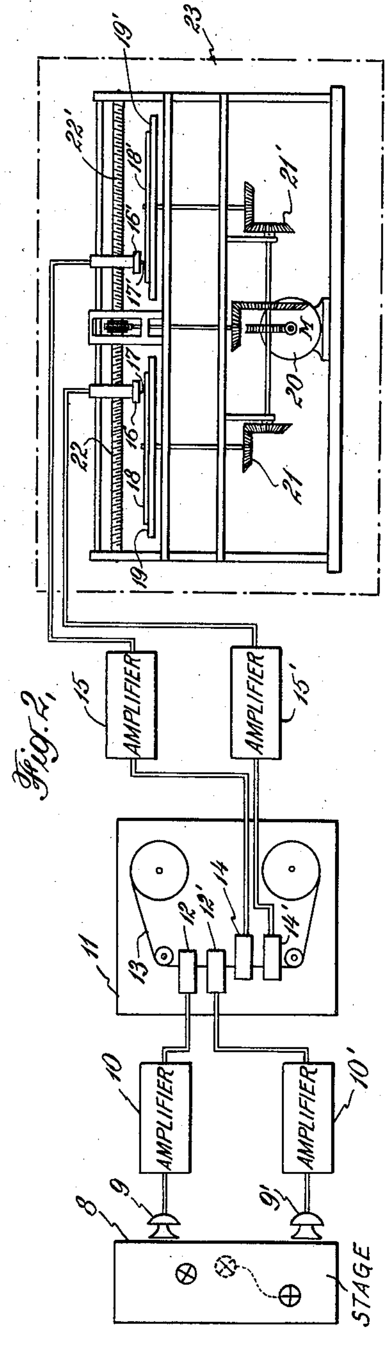
Fig. 2 is a schematic representation of a dual sound pickup, amplifying, and recording system including means to cut stereophonically related master records for the manufacture of the phonograph records of the invention.

The manufacture of the stereophonic phonograph record of the invention utilizes two separate but cooperating recording channels as shown in Fig. 2. Since the stereophonic character of the record of the invention is embodied in its ability to reproduce phase and intensity differences between the sound vibration trains simultaneously perceived at the separated pickup points, these phase and intensity differences must be preserved in proper relation throughout the process of manufacture of the record. It will be seen that the character of the apparatus employed and each step of the method of manufacture involved are directed to this essential requirement.

With reference to Fig. 2, two acoustical-electrical transducers or microphones 9 and 9′ are disposed at spaced locations in relation to one or more sound sources 8, which may be stationary or moving. The source of sources propagate sound waves which are perceived by the microphones and converted thereby into electric signals. In general the sound waves simultaneously arriving from source 8 at the microphones 9 and 9′ will differ in phase and intensity due to asymmetrical positioning of that source relative to the microphones, and signals generated by the microphones will embody these differences.

The signals generated by microphones 9 and 9′ are simultaneously and separately fed to amplifiers 10 and 10′ having substantially identical phase shift and gain characteristics. Following amplification the signals are fed to a recorder 11. This recorder may advantageously be of the type which utilizes a tape 13 having two separate magnetic tracks side by side along its length. The amplified signals are recorded separately in the magnetic tracks on the tape 13 by recording heads or transducers 12 and 12′, and the signals thus recorded may be picked up from the tape by reproducing heads or transducers 14 and 14′, either immediately after they are recorded, or after the signals are edited and the tape is rewound, so that in either case the signals are presented to the reproducing heads in the same sequence in which they were recorded. To preserve the phase relation of the signals between their recording and reproduction by recorder 11, the distance between the recording heads 12 and 12′ must be equal to the distance between the reproducing heads 14 and 14′. Further, as with the amplifiers 10 and 10′, any phase shift occurring in heads 12 and 14 must be substantially duplicated in heads 12′ and 14′, respectively.

The signals generated by heads 14 and 14′ are fed to amplifiers 15 and 15′, and the amplified signals are then fed to electro-mechanical transducers or cutting heads 16 and 16′ of a dual recording lathe 23. These cutting heads are cooperatively connected to the power supply 20 of the lathe so as to be moved radially of the turntables 19 and 19′ by lead screws 22 and 22′ respectively as the cutting proceeds. The two signal channels extending from microphones 9 and 9′ to cutting heads 16 and 16′ should be matched to have substantially identical phase shift and amplitude transfer characteristics.

The cutting heads 16 and 16′ actuate styli 17 and 17′ respectively to record the signals from amplifiers 15 and 15′ as undulations in spiral grooves 104 and 104′ (see Figs. 4 and 5) on the faces of two master recording disks 18 and 18′ of a suitable material such as lacquer or wax, mounted on the turntables. In the preferred embodiment of the phonograph record of the invention the spiral grooves on opposite faces of the disk are oppositely directed as viewed from their respective faces. Thus, if the turntable 19 rotates in the counterclockwise direction as viewed in Fig. 3, the turntable 19′ must rotate in the clockwise direction. The consequence of this arrangement for separately recording the signals is that the styli 17 and 17′ in the cutting heads 16 and 16′ respectively inscribe oppositely directed spiral grooves 104 and 104′ in the faces of their associated master record disks 18 and 18′.

Inasmuch as the sound grooves 4 and 4′ on the opposite faces of the phonograph record of the invention are perforce moved past reproducing styli on playback at the same angular speeds it is necessary that the grooves 104 and 104′ on the master record disks 18 and 18′ be cut at the same angular speeds. This may be achieved by matching the gear trains 21 and 21′ leading from the common power source 20 to the two turntables 19 and 19′.

In addition the sound grooves of the record of Figs. 1*a* and1*b* are, within the limitations previously discussed, congruent, i.e. stereophonically related undulations are at the same radial positions from the center of the record, and are at the same angular and linear distances from their respective groove starting points, which are of the same radial distance from the axis of the record.

To permit the cutting of such congruent sound and lead-in grooves, the lead screws 22 and 22′ have the same pitches and are rotated at the same speed by a common linkage to the motor 20, and the cutting heads are engaged on the lead screws so that their styli are always at the same distance from the centers of rotation of the turntables. The lead screws may be provided at their ends (or near the centers of the turntables) with identical portions of enlarged pitch for the cutting of the lead-in grooves. By the use of such matched lead screws and by counterrotation of the turntables 19 and 19′ at the same speeds, the master records will be cut with lead-in grooves 102 and 102′ merging at sound groove starting points 103 and 103′ with sound grooves 104 and 104′, and the complete groove in one master record will, apart the undulations therein, be a mirror image of the complete groove in the other master record.

Such intaglio grooves, when reproduced as the two opposite faces of a phonograph record, will therefore be congruent, as that term is used herein.

In order that the sound grooves of the two faces of the finished record may be angularly related in known fashion about the record axis, so that similarly angularly disposed reproducing styli in a phonograph may engage stereophonically related undulations in two grooves for proper playback of the record, the master record disks are provided with indexing marks which cooperate with indexing means on turntables 19 and 19′. The indexing of the master records is preserved through the derivative plates and the stampers made therefrom with which the two faces of the final record are pressed. One method of achieving this result is illustrated in Figs. 4–8.

Figures 3, 4, 5, 6:
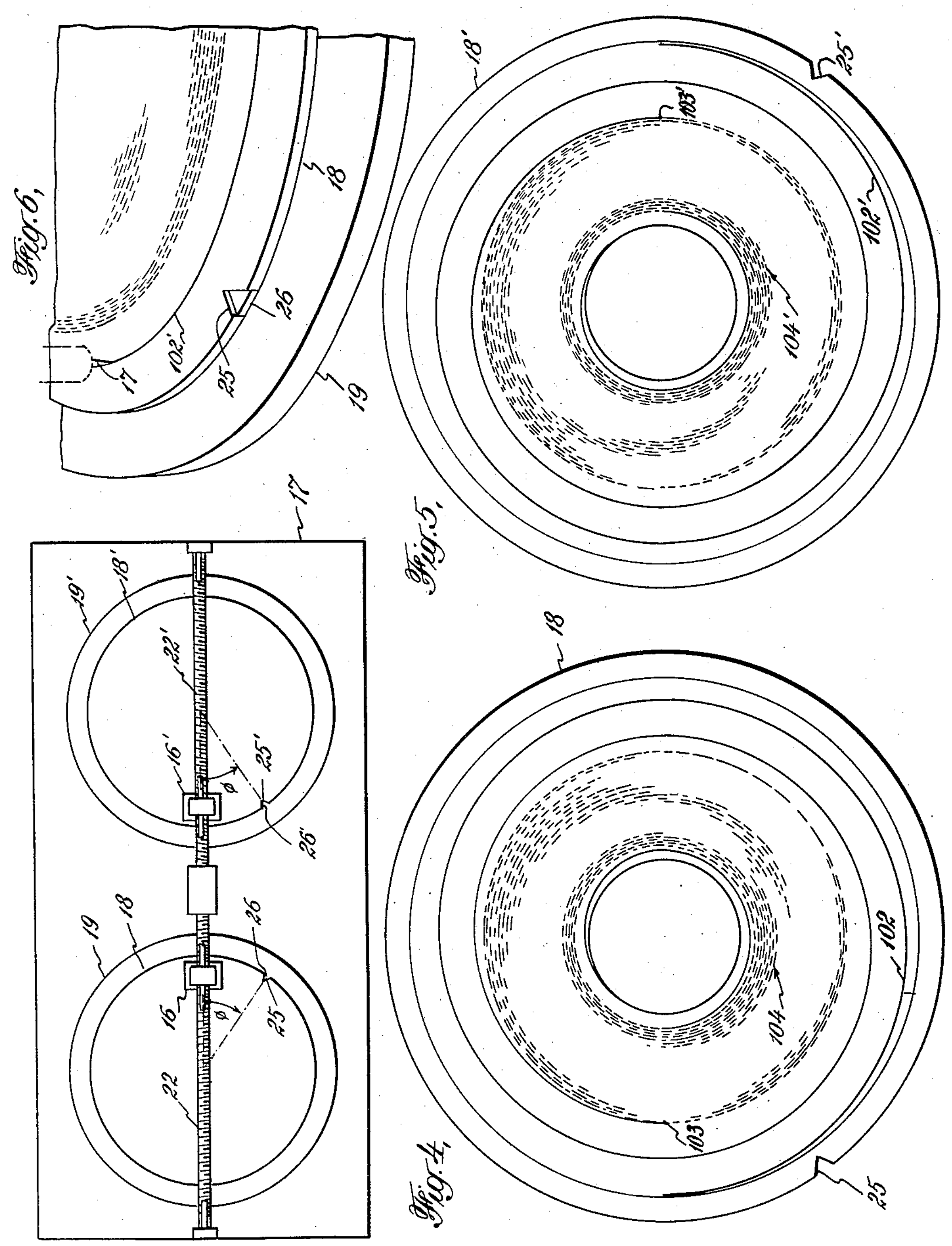
Fig. 3 is a plan view of the recording lathes of the recording system of Fig. 2 showing master recording disks on the lathes prior to cutting.
Fig. 4 is a plan view of the left master record of Fig. 3 after cutting.
Fig. 5 is a plan view of the right master record of Fig. 3 after cutting.
Fig. 6 is a detail view in perspective of one of the recording lathe turntables of Fig. 3 showing a disk positioning key on the turntable and a cooperating notch on the master record disk for establishing a known angular relation between the lead-in and the sound spiral grooves of one of the master recordings and the disk on which it is cut.

With reference to Figs. 4, 5 and 6, the master record disks 18 and 18' are provided with notches 25 and 25' in their circumferential edges. When the blank master disks are positioned on the turntables 19 and 19', the notches 25 and 25' are engaged by similarly shaped keys 26 and 26' fixed to the upper faces of the turntables. The mesh in the gear trains 21 and 21' connecting turntables 19 and 19' with the motor 20 is established upon assembly of the lathe to place the keys 25 and 25' at the same angular positions $\phi$ (Fig. 3) with respect to the axes of the lead screws 22 and 22'. Accordingly when the master record disks 18 and 18' are placed upon the turntables, and throughout the entire cutting operation, the notches 25 and 25' in the master records are always located at equal angular distances from the cutting heads 16 and 16' on the lead screws.

In cutting the master records, the turntables 19 and 19' are set into rotation in opposite directions with the cutting heads 16 and 16' at the same positions radially of the turntables. Lead screws 22 and 22' are engaged with the motor 20 by suitable clutch means not shown to advance the cutting heads toward the centers of the disks 18 and 18' at the same rate. Styli 17 and 17' are simultaneously engaged at the same radial distances of the master record disks 18 and 18' respectively to inscribe lead-in grooves 102 and 102' having the same relatively large pitches. After the styli have begun to cut the small-pitched sound grooves 104 and 104' the amplified signals are simultaneously applied to the cutting heads 16 and 16', and the initial undulations representative of sound vibrations simultaneously perceived at microphones 9 and 9' are inscribed at points 103 and 103' situated at substantially identical angular displacements from the notches 25 and 25' and at the same radial distances from the centers of their respective disks.

From points 103 and 103' inwards, the lead screws 22 and 22' advance the cutting heads 16 and 16' toward the centers of the disks at the same substantially uniform rates so that the styli 17 and 17' inscribe the undulations in spiral grooves 104 and 104' having the same relatively small pitch. In combination with the identity of the angular speeds of the turntables, the identity of radial position of the starting points 103 and 103' and the identity of the pitches of the grooves insure not only that undulations representative of sound vibrations simultaneously perceived will be located at the same angular distances from the points 103 and 103' along their associated spiral grooves 104 and 104', but they will also be located at the same linear distances along their grooves from points 103 and 103'. These spiral grooves containing undulations are inscribed until the faces of the disks are substantially filled and lead-out grooves are appended to the sound grooves.

Following the cutting operation the master record disks 18 and 18' are processed according to one of the known sequences of electroplating and finishing to produce negative stamping dies 51 and 51' (Fig. 7). The positioning notches 25 and 25' must be reproduced as notches or apertures, without circumferential movement relative to the grooves, in each of the successive negative and positive plates which intervene between the original positive wax or lacquer disks 18 and 18', and the nickel or chromium negative dies or "stampers" with which the records of the invention are pressed.

The negative dies or stampers 51 and 51' (Fig. 7) thus produced may then be used in a phonograph record press 50 (Figs. 7 and 8) of conventional design as dies for the opposite faces of the sound reproducing disk 1 of the invention. Again, to preserve the phase differences which characterized the original signal currents generated by the microphones 9 and 9', the spiral ridges 104 and 104' on stampers 51 and 51' containing the undulations representative of sound vibrations must be put into exactly known relation to each other about the common axis of the stampers when the press is closed by engaging the notches 52 and 52' in those stampers, reproduced from notches 25 and 25' in the master records 18 and 18', with similarly shaped keys 53 and 53' fixed to the die fixtures in the record press 50.

For the preferred embodiment of the invention the stampers 51 and 51' are positioned in the record press with their notches 52 and 52' at exactly the same positions about the axis of the record cavity produced when the press is closed, as shown in Fig. 8. If they are otherwise disposed, the pickup arms of the reproducing phonograph must be arranged to engage the two sound grooves of the record at positions differing from each other by the angular separation of the notches 52 and 52'.

Fig. 8 shows fragmentarily a pair of stampers 51 and 51' assembled together in a record press. The press is shown in closed position as it appears at the end of the pressing cycle before the record is removed. The press includes die frames 56 and 56' secured to platens such as those shown at 55 and 55' in Fig. 7. Die inserts 57 and 57' support the stampers in the die frames. The stampers are held in place by die clamping rings 54 and 54'. The positioning keys 53 and 53' project from recessed surfaces of positioning rings 58 and 58'. In producing the preferred embodiment of the record according to the invention rings 58 and 58' are fixed to die inserts 57 and 57' so that keys 53 and 53' projecting therefrom have the same angular disposition about the central axis of the record cavity formed by the press in closed position. Apertures 52 and 52' in the stampers 51 and 51' are formed in the same positions with respect to the spiral sound ridges as are the notches 25 and 25' with respect to the spiral grooves on master records 18 and 18', respectively. The apertures 52 and 52' engage the positioning keys 53 and 53' to locate the stampers with respect to each other.

The preferred method of manufacture of the phonograph record of the invention has been described for purposes of illustration and not of limitation. It will be apparent to one skilled in the art that variations in the method of its manufacture may be made. For example, the step of wire recording may be eliminated in the method; the alternative is, of course, to connect microphones 9 and 9' to appropriate amplifiers 15 and 15' directly. This step permits editing of the signals prior to their being recorded on the master disks and making the master disks at a convenient time and place after the performance, and is preferred for these reasons.

Other means may be employed for locating the master record disks on their turntables. In lieu of the notches and keys, splines on the turntable spindles may be used to engage notches in the center holes of the master records.

The record according to the preferred embodiment of the invention shown in Figs. 1*a* and 1*b* may be played back on a phonograph apparatus of the type shown in Fig. 9, an essential feature of such a machine being the tip-to-tip orientation of the styli 35 and 35'.

The phonograph of Fig. 9 includes a spindle 32 supporting the record for rotation about a vertical axis on a small turntable 36 which leaves the grooved portion of the lower face of the record free for engagement with a playback stylus. A thumb nut 37 may be provided to hold the record stationary with respect to the turntable.

Two playback heads or cartridges 34 and 34' are mounted on arms 33 and 33' which rotate about a common vertical axis defined by the post 30. The cartridges are positioned so that the ends of the styli 35 and 35' are equidistant from the axis of rotation in post 30. The length of the arms and the position of the post 30 may be selected in accordance with the usual practice by which the arc traced out by the styli passes over the record somewhat beyond the end of the spindle 32, as viewed from the post 30.

To permit separate engagement of the styli with the opposite faces of the record the arms 33 and 33' are pivoted at 39 for rotation about a horizontal axis at the end of an arm 31 which rotates on the post 30. The counterweight 38 is provided to effect engagement of the stylus 35' with the lower face of the record.

The signals generated by the styli 35 and 35' are amplified in separate channels and may be fed to separate loud-speakers or earphones, not shown.

In the description of Figs. *1a* and *1b* the lead-in and sound grooves have for simplicity been described as meeting at points 3 and 3'. The transition from lead-in groove pitch to sound groove pitch may of course be a gradual one with the pitch of the lead-in groove varying throughout its length. Neither is it necessary that the sound grooves have the same pitch throughout their length.

The intersections of the lead-in and sound grooves have also been referred to herein as groove starting points, from which equal angular distances lead in the two sound grooves to stereophonically related undulations. Of course it is not necessary to the record of the invention that the change-over points from lead-in to sound grooves on the two faces of the record be so related to the subsequent undulations. If desired, records may be manufactured in which the change over occurs earlier on one face than on the other. However, an important attribute of the record is that the stereophonic relation obtain for the undulations of the two grooves at every angular distance from some pair of undulations, one in each of the grooves, which are stereophonically related.

Of course, if the sound grooves lead from the center toward the edge of the record, the lead-in grooves are provided at the center rather than at the edge of the record.

In the preferred embodiment of the invention the sound grooves are congruent and equiangularly disposed about the axis of the record, so that stereophonically related undulations are located at the intersections with the record faces of lines parallel to the record axis. This construction permits the use of a simple form of reproducing mechanism shown in Fig. 9, in which two pick-up arms of the arcuately moving type and of the same effective length rotate about a common axis parallel to the axis of rotation of the record. The record of the invention may however be manufactured with sound grooves which are congruent and in which the stereophonically related undulations are located at the same angular and linear distances from their sound groove starting points on the two faces of the record but in which the sound groove of one face is angularly displaced with respect to that of the other face. Of course in both the preferred embodiment shown in the drawings and in such a modification, the congruence, as defined herein, need apply only to the portions of the sound grooves which contain the undulations to be stereophonically reproduced. Such a record may be played back with a phonograph having two arcuately moving pickup arms of the same length pivoted for rotation about separate axes parallel to the axis of rotation of the record and equidistant therefrom but angularly staggered about the axis of rotation by the angular displacement between the two sound spiral grooves.

For use with reproducing mechanism in which the playback styli remain always at a fixed bearing from the axis of rotation of the record, i.e. fixed in the frame of reference in which the record rotates, as do the cutting styli in the apparatus of Figs. 2 and 3, records according to the invention may be manufactured subject to the single condition that stereophonically related undulations be disposed on the two faces of the record at equal angular distances from starting points at known bearings on the record defined for its two faces. Thus for example the radial positions of stereophonically related undulations, or the groove pitches of the two sound spirals, or both, may differ between the two faces. Moreover the two sound spiral grooves may be similarly instead of oppositely directed, one being played back from the center to the edge and the other from the edge to the center of the record.

I claim:

1. A method of manufacturing a disk-shaped phonograph record having on its opposite faces oppositely directed spiral sound grooves containing stereophonically related undulations comprising the steps of disposing two microphones at spaced locations relative to a source of sound, amplifying the signals generated by the microphones over two separate channels having similar phase shift characteristics, energizing two record cutting transducers with the amplified signals, cutting in each of two master records indexed in a predetermined angular relation and rotated in opposite directions at the same angular speed spiral sound grooves respectively representative of the sounds perceived by the microphones, forming two separate record pressing indexed matrices from the master records, and pressing the opposite faces of the phonograph record from the two indexed matrices.

2. A method of manufacturing a disk-shaped phonograph record having on its opposite faces oppositely directed spiral sound grooves containing stereophonically related undulations comprising the steps of disposing two microphones at spaced locations relative to a source of sound, amplifying the signals generated in the microphones over two separate channels having similar phase shift characteristics, energizing two record cutting transducers with the amplified signals, engaging the cutting transducers with two separate master records indexed in a predetermined angular relation at the same distance from the centers thereof, rotating the master records at the same angular speed in opposite directions while advancing the cutting transducers radially of the master records at the same rate to produce two separate indexed master records of the sounds perceived by the microphones, forming two separate record pressing indexed matrices from the master records, and pressing the opposite faces of the phonograph record from the two indexed matrices.

References Cited in the file of this patent

UNITED STATES PATENTS

| | | |
|---|---|---|
| 908,778 | Lamb | Jan. 5, 1909 |
| 1,190,072 | Aiken | July 4, 1916 |
| 2,126,370 | Doolittle | Aug. 9, 1938 |
| 2,772,888 | Doncaster | Dec. 4, 1956 |